Dec. 25, 1962     T. C. FURNAS, JR     3,070,693
DIFFRACTION APPARATUS AND METHOD OF USING SAME
Filed June 10, 1959     2 Sheets-Sheet 1

INVENTOR.
THOMAS C. FURNAS, JR.

ATTORNEYS

Dec. 25, 1962 T. C. FURNAS, JR 3,070,693
DIFFRACTION APPARATUS AND METHOD OF USING SAME
Filed June 10, 1959 2 Sheets-Sheet 2

INVENTOR.
THOMAS C. FURNAS, JR.
BY
ATTORNEYS

United States Patent Office 3,070,693
Patented Dec. 25, 1962

3,070,693
DIFFRACTION APPARATUS AND METHOD OF USING SAME
Thomas C. Furnas, Jr., Cleveland Heights, Ohio, assignor to Picker X-Ray Corporation, Waite Manufacturing Division, Inc., a corporation of Ohio
Filed June 10, 1959, Ser. No. 819,398
9 Claims. (Cl. 250—51.5)

This invention relates to a radiant energy diffraction apparatus and to a method of using such apparatus. More particularly, the invention relates to a novel and improved method and apparatus for determining the spatial distribution, direction, wave length, and intensity of radiation emitted by a source and incident upon a specfiable limited area.

Radation falling upon a specifiable limited area may be used, for example, to irradiate a specimen. Such a specimen may be a single crystal. Such a single crystal is irradiated for the purpose of determining its structure. This determination is accomplished by measuring the intensity and direction in which the radiant energy is diffracted by the specimen. The measured intensities are functions of the structure and nature of the specimen. The measured intensities are also functions of the character of the radiation incident upon the specimen. Thus, the measured intensities will vary with the spatial distribution, direction, wave length, and intensity of the radiant energy source.

Studies using prior known techniques and previously available apparatus have relied upon speculative assumptions. These assumptions include:

(1) The radiation to which a specimen is subjected is spatially uniform in intensity for each direction and wave length incident upon the specimen. This assumption is made even though the intensities of different wave lengths are not the same. Previous attempts to study this intensity uniformity have lacked local discrimination of wave lengths and incident direction. Therefore, these previous attempts have given only integrated results.

(2) The radiation to which a specimen is subjected has an identical wave length distribution over the specimen area.

(3) The radiation to which the specimen is subjected is of an identical range of direction over the specimen area.

These assumptions have been followed in cases where the incident radiation is from a real, incoherent and diffuse source such as an X-ray tube. The assumptions have also been followed in cases where the incident radiation is from a virtual directed source such as a diffracting monochromator crystals. Monochromator crystals are employed to limit the spectral content (wave length range) of the radiation incident upon the specimen. These crystals presumably improve the quality and accuracy of the data that may be collected from the specimen.

The fact that a diffracting monochromator crystal disperses the spectrum of wave lengths so that the wave lengths may be separated one from another is utilized. However, even within the narrow band of wave lengths chosen for irradiation of the specimen, there are significant variations. These variations include significant spectral dispersion and spatial differentiation of direction and intensity of the irradiation of different wave lengths. All of these assumptions, some clearly erroneous, are susceptible to direct test and measurement through the method and apparatus of this invention.

The target spot of an X-ray tube emits X-rays in all directions. The emitted rays are of a wide range of wave lengths. The wave lengths are both those which are "white" and "characteristic" for the particular X-ray tube anode under given excitation conditions. When such a source is utilized to irradiate a specimen, it is certain that every part of the specimen is irradiated by rays from each part of the source. It is also certain that each part of the specimen is irradiated by all parts of the source. This phenomenon may be referred to as "diffuse irradiation" of the specimen. Previous proposals directed to the introduction of sheet-like filters, or the like, do not effect the continued diffuse irradiation of the specimen.

With the present invention, a focusing energy analyzer of a known nature is positioned in the path of a radiant energy beam to be analyzed. The analyzer is then rotated. By this rotation the analyzer is successively brought into position to diffract a given wave length of radiation from each part of the source. Simultaneously, other wave lengths from neighboring parts of the source will be diffracted by the analyzer. These diffracted wave lengths are brought appropriately to focus on the focal circle of the analyzer. All of the diffracted wave lengths can be uniquely identified by their position on the focal circle.

The integrated total intensity measured at the analyzer focus, during rotation of the analyzer through a given sufficiently large angle, produces a result in which any source nonuniformities are inconsequential. But, the result is one in which the spectral content (wave length) of the radiation striking the analyzer is clearly identifiable. This is accomplished by detecting and recording the diffracted irradiation emitted by the analyzer throughout the range of the rotation. A detector member is positioned to record this radiation as the rotation is accomplished.

Another feature of the present invention is that the spatial spectral distribution of radiation in the desired specifiable area can be determined. This is accomplished by interposition, in the path of the beam, an appropriate mask which is opaque to the radiation. The mask has a tiny aperture which can be positioned anywhere within the desired specifiable area which is between the analyzer and the source. Thus, the analyzer with its associated detector can present a separate spectral analysis of the radiation which transverses each different position of the aperture in the specifiable area.

An additional feature of the present invention is that the recorded spectrum need not be integrated over the whole rotation. Rather, the recorded spectrum is dispersed in time and space on the detector in synchronism with the rotation of the analyzer. To accomplish this, a film detector may be used. The film in the detector is translated transversely to the plane of diffraction of the analyzer. The film is also moved in synchronism with the analyzer rotation. Further, the film is shielded by an appropriate slit aperture in the plane of diffraction. Thus, each different position along the length of the film will correspond to a particular orientation of the analyzer. The record produced on the film will serve to determine the direction of the rays of different wave lengths incident upon the specifiable area.

The film detector may also be located near the analyzer. The film is so located for the purpose of further defining the direction of the rays incident upon the specifiable area. This also serves to relate the directions to the portion of the source where the rays originate.

Thus, the invention can be used to measure and observe the spatial emission (or diffraction) characteristics of any source. This is true whether the source is real or virtual. As indicated, the invention is primarily intended to analyze the spatial, spectral, directional, and intensity characteristics of radiant energy incident upon a specifiable area, which area may at another time be occupied by a specimen. The invention is, however, equally applicable to determining the characteristics of radiation diffracted or scattered from the specimen.

The spectral characteristics of a given diffraction apparatus can be determined by positioning a monochromator crystal (or a ruled grating) as the analyzer in the path of rays emitted by the source. Simultaneously, a detector means, preferably in the form of a film which is rotated with the crystal to keep it across the beam of radiation diffracted by the analyzer. The detector measures the change in wave length and intensity of the diffracted beam throughout the rotation of the analyzer. By this technique, the variations in intensity and wave length emitting from the radiant energy source may be determined. Further, the wave lengths can be identified by their positions on the film.

Once the variations from a source have been determined, it is possible to state whether or not reliable data can be obtained from a specimen irradiated with that source. Additionally, it is possible to perform mathematical corrections upon the data to remove hitherto ignored sources of systematic error. Further, it is possible to conduct a very exact analysis of the crystal structure of the specimen. This is true because the variation in the diffracted output of the specimen can be analyzed to determine which portion of the variation is attributable to variation in the radiation beam source, and which portion is attributable to the crystal structure of the specimen. Further, whether the specimen is irradiated by a beam of rays from a real source such as an X-ray tube, or a virtual source such as a monochromator crystal is of no inherent effect. That is, it is of no inherent effect regarding the applicability of the invention to the evaluation of the radiation contained in the beam.

The recording of variations when the focusing energy analyzer is rotated is preferably obtained by supporting a film on a pivotal support which also supports the analyzer. Then, as the support is rotated, to rotate the analyzer, the firm is moved with the support. Simultaneously, the film is shifted transversely or translationally of the plane of the energy diffracted by the analyzer so that a sequential photograph is obtained. The sequential photograph reflects the changes in diffracted irradiation which occur as the analyzer is rotated.

Accordingly, one of the principal objects of this invention is to provide a novel and improved apparatus for use in a ray energy mechanism to measure and record variations in wave length, spatial location, direction and intensity of a radiant energy source.

A related object of this invention is to provide a novel and improved method of determining variations in the wave length, ray direction, and intensity of such a ray energy source.

Another object of this invention is to provide a novel and improved apparatus for measuring the variations in wave length, ray direction, and intensity of the ray energy source, which apparatus includes a focusing energy analyzer carried on a pivotal support, wherein the analyzer has a focal circle and a contoured surface on that circle, and wherein the axis of the pivot extends through the circle and intersects the contoured surface.

A related object of this invention and one more specialized is to provide such a novel and improved apparatus in which the energy analyzer is a monochromator cyrstal.

Other objects and a fuller understanding of the invention may be had by referring to the following description and claims, taken in conjunction with the accompanying drawings, in which:

Figure 1:
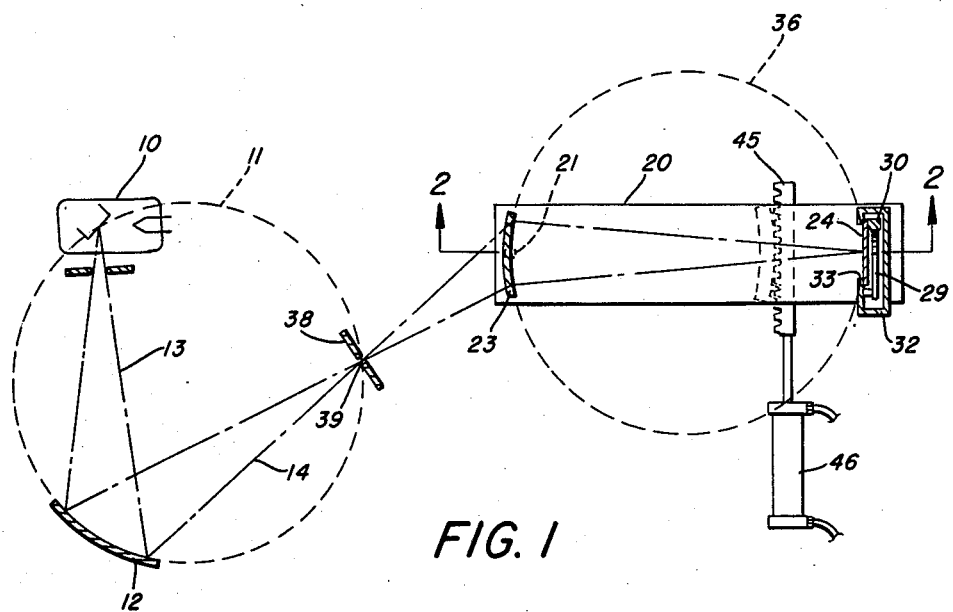
FIGURE 1 is a top plane schematic view of a diffraction apparatus incorporating the novel and improved analyzing mechanism.

In FIGURE 1, a radiant energy source in the form of an X-ray tube is shown at 10. The tube 10 is disposed on a focal circle designated by the numeral 11. The focal circle 11 is the focal circle of a monochromator crystal 12. A beam designated by the numeral 13 is emitted by the tube and directed against the crystal 12. The beam 13 is diffracted by the crystal 12 into a diffracted beam 14. The diffracted beam 14 is of a very narrow wave length. The beam 14 comes to a focus along the focal circle of the monochromator crystal 12. Since the source of the diffracted beam 14 is the crystal 12, it may be referred to as a beam from a "radiant energy virtual source."

Figure 5:
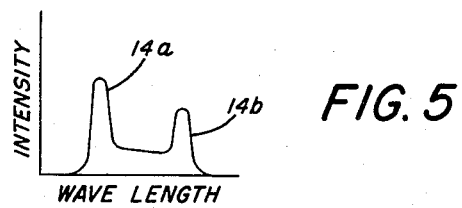
FIGURE 5 is a graphic presentation of a typical intensity distribution at the focus of the ray pattern of FIGURE 4.
Figure 4:
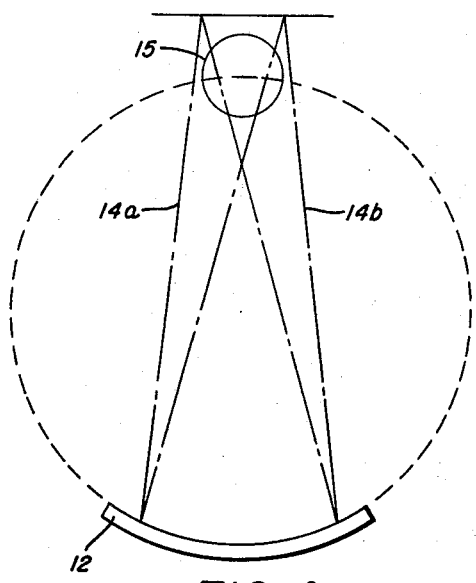
FIGURE 4 is a schematic view showing a typical ray distribution of a monochromatic crystal.

The characteristics of the diffracted beam 14 can best be understood by reference to FIGURES 4 and 5. There, typical characteristics are disclosed schematically and graphically. To each part of the focal circle of the monochromator crystal, the virtual source 12 emits a diffracted ray of a particular wave length. Rays describing two such wave lengths are schematically shown and designated by the numerals 14a, 14b. It will be seen that 14a strikes one side of the specimen 15, while 14b strikes the other. No part of the specimen 15 is irradiated by both 14a and 14b and a substantial portion of the specimen is not irradiated by either.

Heretofore, analytical studies have been conducted on the assumption that a specimen is uniformly irradiated by diffracted radiant energy waves from a virtual source such as the monochromator crystal 12. As the schematic diagram of FIGURE 4 demonstrates, this assumption is not necessarily valid. It is particularly not valid if the resolution of neighboring strong wave lengths is good yet their physical separation on the focal circle and at the specimen position is not significantly greater than the size of the specimen. It is also not valid if there are some inherent systematic defects in either the tube 10 or the crystal 12. Further, as demonstrated graphically in FIGURE 5, further systematic errors may reside in the fact that the intensity of the waves 14a, 14b may not be equal. This, of course, may be true of every wave length present, whatever the number of wave lengths.

This invention is directed to a mechanism for determining just what systematic errors may be present. To accomplish this, a moveable support 20 is provided. The support 20 is pivotally mounted at 21 on a base 22. The base may form a part of the body of a diffractometer. A focusing energy analyzer 23 is mounted on the support 20. In the disclosed arrangement this focusing energy analyzer is in the form of a monochromator crystal. It may also take the form of a ruled grating or the like. The analyzing crystal 23 may be either a reflection crystal or, as shown, a transmission crystal. By way of explanation, a reflection crystal is one of the type shown at 12 which diffracts in a mirror-like fashion from atomic planes approximately parallel to the extended surface. A transmission crystal is one which passes the ray energy through it as shown at 23, and diffracts from atomic planes approximately perpendicular to the extended surface. More specifically, all useful X-rays diffracted from a transmission crystal have passed through the crystal whereas all useful X-rays diffracted from a reflection crystal emerge from the same surface as they were incident upon before diffraction.

An energy detector in the form of a sheet-like film 24 is also mounted on the support 20. The film 24 is carried by the support 20 to oscillate with the support 20 and the energy analyzer 23. Preferably, a suitable means is also provided to cause the film 24 to reciprocate up and down in an exact relation to the oscillation of the support 20. Thus, the film 24 is moved translationally transversely across the plane of the radiant energy diffracted by the analyzer 23. A mechanism for providing oscillation of the support 20 is shown schematically in the form of a rack and gear 45 and a motor drive 46.

Figure 2:
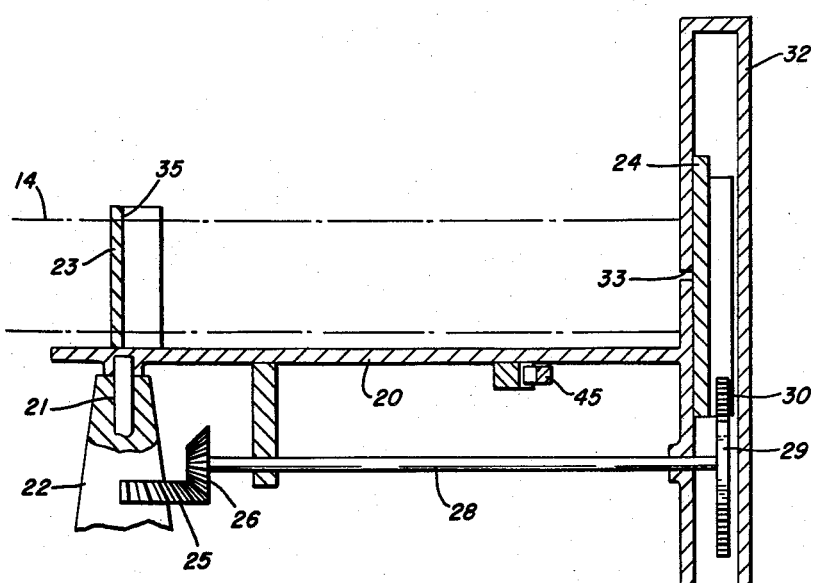
FIGURE 2 is a sectional view as seen from the plane indicated by the line 2—2 of FIGURE 1, of the analyzing mechanism and on an enlarged scale with respect to FIGURE 1.

One suitable mechanism for causing the film 24 to reciprocate transversely to the plane of diffraction as the support 20 oscillates back and forth about the pivot 21 is best shown in FIGURE 2. There, a beveled gear segment 25 is fixed to the base 22. A second beveled gear 26 meshes with the fixed beveled gear segment 25. As the support 20 rotates about the pivot 21, shaft 28 which is carried by the support 20 will move with it. The shaft 28 is fixed to the gear 26. Thus, as the support 20 oscillates, the interaction of the gears 25, 26 will cause the shaft 28 to rotate alternately in opposite directions.

Suitable gearing such as the pinion gear 29 is fixed to the opposite end of the shaft 28. The pinion gear 29 meshes with a rack 30. Oscillating rotation of the pinion 29 will cause the rack 30 to shift reciprocally up and down. The film 24 is connected to the rack 30 to reciprocate with it.

The film 24 is, of course, housed in a light box 32. The light box includes a slit aperture 33 in front of the film 24 to permit the portion of the film 24 opposite the aperture to be exposed. The slit aperture is disposed in the plane of the energy diffracted by the analyzer 23. The slit aperture 33 is fixed relative to the support 20. Thus, the slit aperture 33 may be supported directly from the support 20 or by the light box 32 provided the box does not reciprocate with the film 24.

In a study conducted with the apparatus of FIGURE 1, the film 24 is preferably disposed on focal circle 36 of the focusing energy analyzer 23. As has been indicated, other studies can be conducted with a film which is positioned near the analyzer 23. This is accomplished by fixing a film relative to the support 20 and the analyzer 23 and in the path of the diffracted beam of the analyzer 23. The film then moves with the analyzer 23, but not relative to it. With such a study, the distribution of wave lengths and ray direction may be determined.

As indicated, the energy analyzer 23 is positioned in the path of the crystal diffracted beam 14. During the entire study, the analyzer 23 is preferably maintained in the path of the beam 14. In the preferred arrangement, this is accomplished by positioning the analyzer 23 immediately above the pivot 21. The analyzer 23 has a surface 35 which is on the focal circle 36 of the analyzer 23. The analyzer 23 is positioned such that, in the preferred arrangement, an extension of the axis of the pivot 21 bisects the surface 35. Thus, the pivot axis 21 will be disposed across the midpoint or center line of the beam 14, and the analyzer 23 will be, at all times, positioned approximately symmetrically about that center line.

The crystal surface 35 is, as mentioned, on the focal circle 36. It is on that circle either in the sense of defining a segment of the circle or being tangential to it. In the case of a tangential analyzer, it will be seen that the line of tangency will be approximately coincident with the axis of the pivot 21. Additionally, the film 24, or other detector, is preferably retained in the path of the beam diffracted by the analyzer 23. This is accomplished by limiting the extent of oscillation of the support 20 and by providing a film of sufficient width such that it is always in the path of the energy difffracted by the analyzer.

As previously indicated, a mask 38 which is opaque to radiant energy may be provided. The mask 38 has a tiny aperture 39 in it. This mask 38 is positioned at a selected location between the virtual source 12 and the analyzer 23 with the axis of the aperture 39 positioned anywhere within the specifiable area which may at another time be occupied by a specimen in the beam 14. A study conducted with the mask 38 so located, analyzes the characteristics of the beam through the tiny aperture 39.

When the system is tested, the tube 10 is energized and caused to emit a radiant energy beam for a protracted period of time. The support 20 is caused to rotate about the pivot 21. This support rotation, as noted, causes the attached analyzer and detector to move with it. Rotation of the support 20 may be obtained by any suitable mechanism. One such mechanism is shown schematically in the form of a worm wheel and worm on the shown rack and gear 45 and an attached motor 46.

Figure 3:
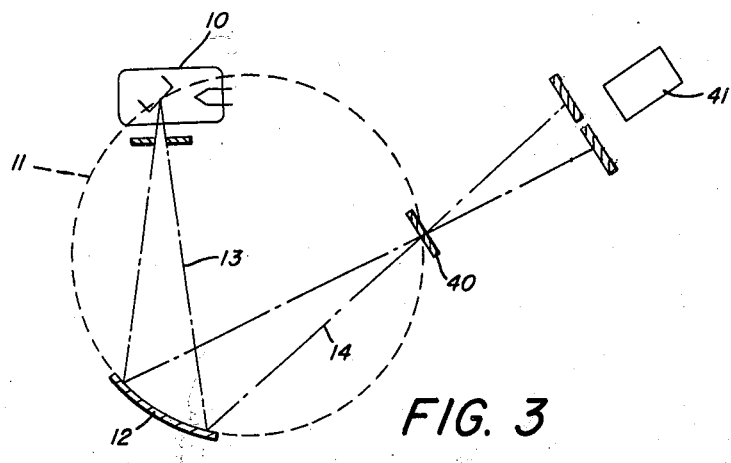
FIGURE 3 is a schematic view of the device of FIGURE 1 with a specimen positioned for study.

In FIGURE 3 a schematic view of the usual diffraction apparatus is shown. There, a specimen 40 is positioned in the path of the beam 14. The specimen 40 is positioned at the location of the mask 38 in FIGURE 1. The energy diffracted by the specimen 40 is recorded by a suitable detector 41. In analyzing the specimen 40, a two-step test is conducted. The order of the two steps is immaterial. In one step the specimen 40 is positioned in the path of the diffracted beam 14 and the data is collected by the detector 41. In the other step the test of the system described in connection with FIGURES 1 and 2 is conducted. The data collected by the analyzer detector such as film 24 is factored out of the data collected by the specimen analyzer detector 41. The result obtained by such factoring then is data pertinent to the specimen 40 and free of certain systematic errors described earlier regarding assumptions that are commonly made. It is not necessary that means now be shown for performing the above-mentioned "factoring" operation, for all the possible variation of results that may be obtained as a result of performing the test which is the object of this invention. Indeed, as earlier mentioned, the result of this test may prove that the given experimental arrangement is not capable of giving correct and properly interpretable data from a specimen by any presently known technique and that therefore appropriate modifications may be required of the experimental arrangement before interpretable data can be obtained.

While the invention has been described with a great deal of detail, it is believed that it comprises a novel and improved apparatus and method of using that apparatus, wherein the apparatus has a focusing energy analyzer carried by a pivotal support and positioned in the path of rays emitted from an energy source, and detector means carried by the same support to move with the support and analyzer and to record the characteristics of the energy diffracted by the analyzer.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In an X-ray diffraction device having a first monochromator crystal positioned to receive and diffract rays from an X-ray source, a pivot support rotatable about an axis, a second monochromator crystal mounted on the support and along the axis of the pivot, the second crystal being disposed in the path of rays diffracted by the first crystal, ray responsive detecting means positioned on the support and disposed in the path of rays diffracted by the second crystal, and means to pivotally oscillate said support about said axis while maintaining said detector in the path of rays diffracted by the second crystal.

2. In an apparatus having a radiant energy source, a mechanism for analyzing the energy source comprising, a ray emitting source, a base, a support pivotally mounted on the base, a focusing energy analyzer carried by the support and disposed in the path of radiant energy emitted from the source, detector means mounted on the support positioned to receive radiant energy diffracted by the analyzer; said support, said analyzer and said detector means being pivotal together about said base pivotal mount through a pivot range; said analyzer when in any position in said pivot range being in the path of rays emitted by said source, said detector means comprising a film and means to reciprocate said film in a path transverse to the plane of said support oscillation.

3. The method of analyzing a radiant energy beam comprising, positioning a focusing energy analyzer in the path of the radiant energy beam, providing an energy detector including a film and means to move the film translationally, positioning the detector with the film in the path of a beam of energy diffracted by the energy analyzer, sequentially and repetitively rotating and counterrotating the analyzer while maintaining the analyzer in the path of said radiant energy beam and the film in the path of the analyzer diffracted beam, and moving the film translationally across said analyzer diffracted beam while the analyzer is being rotated.

4. In an apparatus having a radiant energy source, a mechanism for analyzing the energy source comprising, a ray emitting source, a base, a support pivotally mounted on the base, a focusing energy analyzer mounted on the support and disposed in the path of radiant energy emitted from the source, detector means mounted on the support and positioned to receive radiant energy diffracted by the analyzer, said detector means including a film and means to shift the film translationally in a path which is transverse to said plane of diffraction; said support, said analyzer, and said detector means being pivotal together about said base pivotal mount through a pivot range; the movement of said support about said pivot being generally parallel to said plane of diffraction and generally normal to the pivot axis; said analyzer when in any position in said pivot range being in the path of rays emitted by said source, and means connected to said support to oscillate the support back and forth in said pivot range.

5. The method of analyzing the output of a radiant energy source which method comprises:
 (a) positioning a focusing energy analyzer in the path of said source of radiant energy;
 (b) positioning a detector in the path of energy diffracted by the analyzer;
 (c) maintaining the relative angular relationship of the analyzer and detector constant while sequentially and repetitively rotating and counter-rotating the positioned analyzer and detector while simultaneously retaining the analyzer in said path of source radiant energy and the detector in the path of said analyzer diffracted energy;
 (d) reciprocating at least a portion of said detector in a fashion coordinated with said rotating and counter-rotating in a plane transverse to said path of diffracted energy; and,
 (e) recording the energy so detected to determine spatial and wave length characteristics of the diffracted energy.

6. The method of analyzing a specimen with the output of a radiant energy source which method comprises:
 (a) positioning a focusing energy analyzer and a specimen in one position selectively and one at a time in the path of said source radiant energy;
 (b) positioning a detector in the path of energy diffracted by the analyzer when the analyzer is in one position;
 (c) sequentially and repetitively rotating and counter-rotating the positioned analyzer and detector while simultaneously retaining the analyzer in said path of source radiant energy and the detector in the path of said analyzer diffracted energy;
 (d) recording and analyzing the diffracted energy to determine the spatial distribution and wave lengths thereof;
 (e) positioning the specimen in the path of source ray energy at another time and conducting a ray energy study of the specimen at a time when the specimen is in said one position; and,
 (f) recording the results of said ray energy study, whereby the results of step d may be compared with the results of step e to factor out systematic errors and thereby determine the true characteristics of the specimen.

7. In an apparatus having a radiant energy source, a mechanism for analyzing the energy source comprising:
 (a) a ray emitting source;
 (b) a base;
 (c) a support pivotally mounted on the base;
 (d) a focusing energy analyzer mounted on the support and disposed in the path of radiant energy emitted from the source;
 (e) oscillatory means and detector means mounted on the support and positioned to receive radiant energy diffracted by the analyzer;
 (f) said support, said analyzer, said oscillatory means and said detector means being pivotal together about said base pivotal mount through a pivot range while maintained in the same relative angular position;
 (g) said analyzer when in any position in said pivot range being in the path of rays emitted by said source;
 (h) means connected to said support to oscillate the support back and forth in said pivotal range while the angular relationship of the mounted analyzer and detector is maintained constant;
 (i) said oscillatory means being reciprocal relative to the support in a path transverse to the beam emitted by the analyzer and reciprocal in coordination with the rotation of the support; and,
 (j) said detector means being to detect the beam emitted by the analyzer and to determine spacial distribution and wave length characteristics of the beam.

8. In an X-ray diffraction apparatus having a radiant energy source a mechanism for analyzing the energy source comprising:
 (a) an X-ray emitting source;
 (b) a base;
 (c) a support pivotally mounted on the base;
 (d) a monochromator crystal carried by the support and disposed in the path of radiant energy emitted from the source;
 (e) oscillating means and detector means mounted on the support and positioned to receive radiant energy diffracted by the crystal;
 (f) said support, said crystal, said oscillating means, and said detector means being pivotal together about said base pivotal mount through a pivot range while maintained in the same relative angular position;
 (g) said crystal when in any position in said pivot range being in the path of rays emitted by said source;
 (h) means connected to said support to oscillate the support back and forth in said pivot range while the angular relationship of the mounted analyzer and detector is maintained constant;
 (i) said oscillatory means being reciprocal relative to the support in a path transverse to the beam emitted by the analyzer and reciprocal in coordination with the rotation of the support; and,
 (j) said detector means being to detect the beam emitted by the analyzer and to determine spacial distribution and wave length characteristics of the beam.

9. The device of claim 7 wherein the focusing energy analyzer is a substantially perfect crystal.

References Cited in the file of this patent

UNITED STATES PATENTS

| | | |
|---|---|---|
| 2,540,821 | Harker | Feb. 6, 1951 |
| 2,805,340 | Lewis | Sept. 3, 1957 |
| 2,805,341 | Lang | Sept. 3, 1957 |
| 2,887,585 | De Wolff et al. | May 19, 1959 |
| 2,898,469 | Rose | Aug. 4, 1959 |